United States Patent Office 3,511,480
Patented May 12, 1970

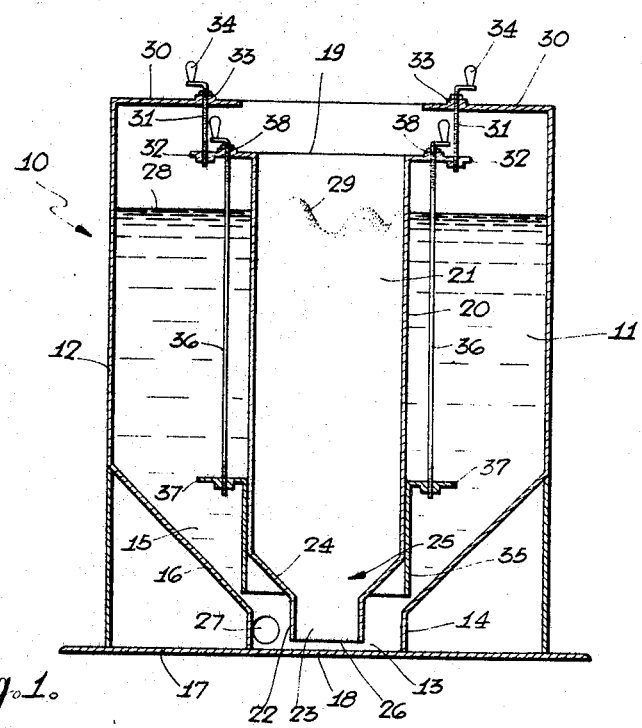
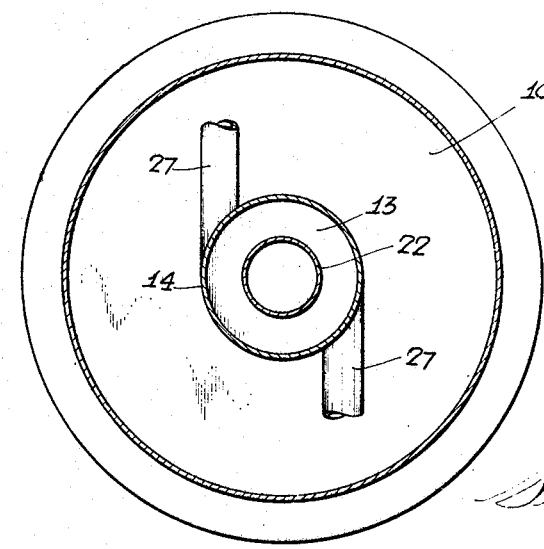

3,511,480
MIXING APPARATUS
Jan Visman, and Lawson S. Sims, Edmonton, Alberta, Canada, assignors to Canadian Patents and Development Limited, Ottawa, Ontario, Canada, a corporation of Canada
Filed Aug. 28, 1968, Ser. No. 755,941
Int. Cl. B01f 5/00
U.S. Cl. 259—60                                    6 Claims

ABSTRACT OF THE DISCLOSURE

A mixing apparatus for forming suspensions of solid particles in a liquid has an outer liquid supply tank, an inner solids supply tank concentrically arranged within the outer tank and having a bottom opening communicating with the lower section of the outer tank. Tangentially arranged slurry outlets lead from the lower section of the outer tank.

BACKGROUND OF THE INVENTION

Field of the invention

The invention lies in the field of apparatus for mixing solids and liquids to form slurries thereof. The invention is in the specific field of formation of aqueous suspensions of coal fines and ore particles for the purpose of cleaning and beneficiating such materials.

Description of the prior art

There are many types of available and proposed devices for mixing liquids and solids but these usually require mechanically moving parts and, as a consequence, are relatively costly in structure and operation.

SUMMARY OF THE INVENTION

The invention seeks to provide a gravity feed type of apparatus wherein mixing is effected without use of moving parts and wherein movement of the elements of the device, following initial adjustments thereof, is unnecessary. The invention further proposes to provide an even supply of a slurry or suspension of solids in a liquid under variable feed conditions such as, for instance, in cases where the solids supply occurs in surges.

Cleaning of coal fines and concentration of ground ore is frequently carried out by producing an aqueous suspension of such solid particles and then subjecting the resulting slurry to a cyclone separation system. The slurry pump needed to feed the slurry to the system requires an even feed and presently solids supplied in surges are fed to a separate surge tank from where they are fed to a slurry mix tank by means of a mechanical feeder. The combination of surge tank, mechanical feeder and mix tank is relatively costly, and requires considerable space head room.

The present invention thus seeks to combine, in the specific instance mentioned, the function of a surge tank and a mix tank in one aggregate structure, without the need for a separate mechanical feeder.

BRIEF DESCRIPTION OF THE DRAWING

FIG. 1 is a sectional elevation of an apparatus in accordance with the invention, and
FIG. 2 is a sectional plan view.

DESCRIPTION OF THE PREFERRED EMBODIMENT

In the drawing, 10 is an outer tank having an upper section 11 of major volume as formed by the cylindrical wall 12. The tank has a lower mixing section 13 of very minor volume as formed by the cylindrical wall 14. In the drawing, by way of example, the diameter of section 13 is about one-third that of section 11 and its axial extent is about one-tenth that of section 11. A conical section 15 formed by conical wall 16 joins sections 11 and 13. The tank has a supporting base 17 and a closed bottom wall 18.

Concentrically arranged within and spaced from tank 10 is an innter tank 19 having an upper cylindrical wall 20 forming an upper section 21 of major volume, a lower cylindrical wall 22 forming a lower section 23 of very minor volume, and a conical wall 24 joining walls 20 and 22 and forming an intermediate conical section 25. As shown, wall 24 is in parallel opposed relation to wall 16 of the outer tank and wall 22 is in parallel, substantially opposed relation to wall 14 of the outer tank. The lower end 26 of the inner tank is open and in spaced relation to bottom wall 18.

While dimensions may vary greatly, the diameter of section 21 of the inner tank may be about one-third of that of section 11 of the outer tank and the diameter of the lower section 23 of the inner tank may be about one-half that of the lower section 13 of the outer tank.

One or more (two as shown), slurry outlet pipes 27 extend tangentially from the lower section 13 of the outer tank.

In operation, tank 10 contains a body of water 28 and tank 19 a body of solid particles 29 and a continuous or intermittent feed of water and solids is made to the respective tanks. The tangential outlets 27 cause the water in lower section 13 to flow or swirl in a stream of circular direction and this rapidly flowing stream entrains solid particles moving out of the lower end of tank 19 which, as previously indicated, is disposed in section 13. Thus, a uniform and even flow of suspension or slurry moves through outlets 27.

Means are provided for adjusting both the flow of water and solids to the mixing section 13. Various types of means may be provided for this purpose and a suitable means is illustrated by way of example.

Tank 19 is suspended from brackets 30 fixed to tank 10 by means of rods 31 fixed to brackets 32 on tank 19. Each rod 31 has a screw threaded mounting 33 in bracket 30 and is provided with a crank 34 which may be revolved to move tank 19 axially in an up or down direction to adjust the clearance between lower end 26 and bottom wall 18.

A cylindrical collar 35 surrounding the lower portion of tank 19 is suspended from brackets 32 by means of rods 36 and brackets 37 on the collar. Each rod 36 has a screw-threaded mounting 38 in bracket 32 and is provided with a crank 39 for moving the collar in an up or down direction. The lower end of the collar is in spaced confronting relation to conical wall 16 to provide an annular clearance through which water from tank 10 is fed into mixing section 13.

We claim:
1. Mixing apparatus comprising an outer liquid-receiving tank having an upper section of major cross-sectional area and axial extent, a lower cylindrical section of minor cross-sectional area and axial extent, an intermediate conical section leading from said upper section to said lower section, and tangentially arranged outlet pipes leading from said lower section, said lower section having a closed bottom wall, and an inner solids-receiving tank axially disposed within said outer tank and having an open end located within said lower section but spaced from said bottom wall to provide a solids outlet in said lower section.
2. Mixing apparatus as defined in claim 1, including means for adjusting axially the position of said inner tank with respect to said outer tank to adjust the size of said solids outlet.

3. Mixing apparatus as defined in claim 2, including means for controlling liquid flow from said conical section to said lower section of said outer tank.

4. Mixing apparatus comprising an outer liquid-receiving tank having an upper cylindrical wall of major diameter and axial extent forming an upper section, a lower cylindrical wall of minor diameter and axial extent forming a lower section, an intermediate conical wall joining said upper and lower sections and forming an intermediate section, and tangentially arranged outlet pipes leading from said lower section, said lower section having a closed bottom wall, and an inner solids-receiving tank axially arranged within but spaced from the walls of said outer tank and having an upper cylindrical wall extending throughout the major axial extent of said upper and conical sections of said outer tank, a lower cylindrical wall extending into said lower section of said outer tank, and a conical wall joining said upper and lower walls of said inner tank, said inner tank having a bottom opening spaced from said closed bottom wall to form a solids outlet leading from said inner tank to said lower section of the outer tank.

5. Mixing apparatus as defined in claim 4, including means for adjusting the size of said solids outlet comprising means for moving said inner tank axially with respect to said outer tank.

6. Mixing apparatus as defined in claim 5, including means for controlling liquid flow from said conical section to said lower section of said outer tank comprising a collar surrounding a portion of said inner tank and having a lower end in spaced confronting relation to said concial wall, and means for moving said collar axially with respect to said conical wall.

References Cited

UNITED STATES PATENTS 3,298,669   1/1967   Zingg _____ 259—4

FOREIGN PATENTS 1,367,515   6/1964   France.

EDWARD L. ROBERTS, Primary Examiner

U.S. Cl. X.R.

259—180